United States Patent Office 3,243,412
Patented Mar. 29, 1966

3,243,412
METHOD OF POLYMERIZING WATER CONTAMINATED FORMALDEHYDE GAS
Glen Allan Russell, Ames, Iowa, and Louis L. Wood, Clarksville, Md., assignors to W. R. Grace & Co., a corporation of Connecticut
No Drawing. Filed Oct. 10, 1962, Ser. No. 229,717
10 Claims. (Cl. 260—67)

The present invention relates to the preparation of polyoxymethylene polymers, and more specifically to an improved method by which gaseous formaldehyde may be quickly and economically converted into high quality polyoxymethylene polymers.

It is generally known that formaldehyde in the presence of a suitable catalyst will polymerize to form useful polyoxymethylene polymers. The quality of these polymers as well as the efficiency by which the polymerization proceeds is frequently dependent on the purity (water content) of the formaldehyde used. It is often found that small amounts of water will cause formation of inferior products due to its chain transfer effect.

In practice, it has been found, that it is almost impossible to completely remove water in gaseous formaldehyde by any reasonable physical process. Hence to date commercial producers of polyoxymethylene have frequently been plagued with erratic and frequently unsatisfactory results when attempting to produce polyoxymethylene on a commercial scale from a formaldehyde which inherently possesses small quantities of moisture.

It is therefore an object of the present invention to provide a method for polymerizing gaseous formaldehyde into a high quality polyoxymethylene polymer which is not effected by small amounts of water.

It is another object to provide an efficient formaldehyde polymerization process which does not require the presence of a complex catalytic system.

It is still another object to provide a method by which crude water containing formaldehyde may be directly and efficiently polymerized into a high quality polyoxymethylene polymer without the use of a specific catalytic system.

These and still further objects of the present invention will become readily apparent to one skilled in the art from the following detailed description and specific examples.

Broadly, the present invention contemplates a method for preparing polyoxymethylene polymers which comprises introducing gaseous formaldehyde into a reaction medium of dimethyl sulfoxide, and subsequently recovering the polyoxymethylene which spontaneously forms within the reaction medium.

More specifically, we have found that if crude gaseous formaldehyde such as produced by the pyrolysis of paraformaldehyde is conducted directly into a body of dimethyl sulfoxide maintained at a temperature of from about 0 to about 100° C., a gelatinous mass of polyoxymethylene will spontaneously form. This gelatinous mass of polyoxymethylene in dimethyl sulfoxide may then be readily converted into a useful particulate polymer by (1) heating the mass to the point at which the polyoxymethylene fully dissolves in the dimethyl sulfoxide (about 125 to about 180° C.), and (2) pouring the heated mass into an approximately equal volume of a solvent for dimethyl sulfoxide and a non-solvent for polyoxymethylene. When the heated polyoxymethylene-dimethyl sulfoxide solution comes in contact with the non-solvent, a particulate high molecular weight polyoxymethylene precipitates which may be readily filtered and dried.

The polyoxymethylene polymers produced by this method possess a melting point of about 170–176° C. Furthermore, the reduced specific viscosity (N sp./c.) of the polymers as determined at 140° C. using 0.15% solutions in benzyl alcohol containing 1% diphenylamine and 0.05% N,N,N',N - tetrakis (2-hydroxyl propyl) ethylene diamine as stabilizers range from about 0.5 to about 1.5 deciliters/gram (dl./g.).

Formaldehyde which is used in the present invention may be obtained from any known source. Typically, gaseous formaldehyde as produced by the pyrolization of paraformaldehyde and which inherently contains up to about 5% water may be used. Formaldehyde sources such as aqueous formaldehyde and trioxane may also be conveniently used when appropriate steps are taken to produce a gaseous formaldehyde having a moisture content of below about 5 to 10%.

As indicated previously, the use of dimethyl sulfoxide gas which contains considerable moisture as measured by prior art polymerization standards. Apparently dimethyl sulfoxide acts in a manner that prevents attendant water from performing its normal chain transfer function. Generally speaking, polyoxymethylene formation will occur in dimethyl sulfoxide which contains up to about 10% by weight of water. However, for optimum results in terms of maximum yield and highest molecular weight, it is preferred that the dimethyl sulfoxide contains as little water as possible. From this standpoint, for the most efficient practice of the invention, the incoming formaldehyde gas should contain as small a proportion of water as is feasible to maintain. Thus, for example, while gaseous formaldehyde which contains 5 to 10% and even more water may be readily used in this method, a water content in this range will quickly accumulate in a dimethyl sulfoxide medium to a point where decreasing yields and molecular weight is obtained. To obtain maximum molecular weight, it is preferred that the water content of the formaldehyde gas be reduced to below 1%. This moisture level is obtained using conventional processing means.

The formaldehyde gas which is introduced into the dimethyl sulfoxide medium is maintained at a non-polymerization temperature of about 40 to about 100° C. Furthermore, an inert carrier or sweep gas may be advantageously used to carry the formaledhyde gas from its source to the polymerization chamber. Inert gases such as nitrogen, argon, helium, and so forth, maintained in from about 1 to about 10% volume in admixture with formaldehyde gas will yield satisfactory results.

The dimethyl sulfoxide reaction medium is maintained at a temperature of from about 0 to about 100° C. during the introduction of the formaldehyde gas. Higher temperatures appear to discourage high molecular weight chain formation. Temperatures lower than that specified cause the freezing of dimethyl sulfoxide and prevent efficient contact of formaldehyde gas therewith. Ordinarily the formaldehyde gas is added at a rate which enables or encourages the longest possible contact of the gas with the dimethyl sulfoxide medium. The particular rate selected will depend on the apparatus available, however, in general, a formaldehyde feed rate in the neighborhood of 1 g. per 1–100 ml. dimethyl sulfoxide/minute will yield satisfactory results.

The formaldehyde gas is added to the dimethyl sulfoxide for a period sufficient to form a desired amount of polymer. The precise time period over which the formaldehyde is added is not critical and will vary according to feed rate, moisture content, reaction temperature, and degree of gel formation which is encountered. In general, it is not desired to attain a water content in the dimethyl sulfoxide greater than about 10% by weight. Exceeding this concentration apparently encourages chain transfer which results in lower molecular weight products.

Furthermore, if more than about 10% by weight polyoxymethylene is formed in the dimethyl sulfoxide, an increasingly viscous gel is formed. After a certain point the viscosity of the gel will be such that increasing difficulty is encountered in passing more formaldehyde gas therethrough.

As mentioned earlier, the use of dimethyl sulfoxide obviates the necessity of using any conventional formaldehyde polymerization catalyst. Furthermore, it is found that dimethyl sulfoxide may be used in conjunction with other organic solvents such as benzene and carbon tetrachloride. Furthermore, if it is desired, a conventional basic polymerization catalyst such as tertiary amines may be used in conjunction with dimethyl sulfoxide to obtain good yields of polymer.

As indicated previously, the polyoxymethylene obtained in the practice of this invention forms stable gels with the dimethyl sulfoxide as it is formed. To break this gel and obtain a workable polymer, the gel is simply raised to above the melting point of the polyoxymethylene contained therein (about 170 to 200° C.), and the entire mass is poured into a non-solvent for the polyoxymethylene such as water. The polyoxymethylene then separates as a filterable solid which may be dried by washing with acetone and subsequently heating. After the removal of polyoxymethylene and water, the dimethyl sulfoxide may then be recycled for use in another polymerization.

Having described the essential embodiments of the present invention, the following specific examples are given to illustrate embodiments thereof.

EXAMPLES

In each of the examples listed below, formaldehyde gas was obtained by heating 100 g. of paraformaldehyde in a 500 ml. flask to 150 to 160° C. The formaldehyde gas which evolved contained about 5% water and was carried at a rate of 1 g. formaldehyde per minute by way of a tube maintained at a temperature of 40 to 60° C. A stream of nitrogen sweep gas was maintained at a rate of 15 ml./minute throughout the system. The formaldehyde gas was introduced into 50 ml. of reaction medium maintained at room temperature (20° C.).

After passing the formaldehyde gas through the various reaction media set forth for 4–10 minutes as indicated, the reaction masses were allowed to stand for 10 minutes before workup. Workup of the reaction masses consisted of mixing the gel with equal volumes of acetone filtering off most of the acetone —DMSO. The resultant amorphous mass is dried for 12–24 hours at 1–10 mm. Hg pressure at 50–70° to obtain solvent free polymer. The polymers melted between 170 and 176° C.

Using the above general polymerization and workup procedure the examples below were run using (1) dimethyl sulfoxide (DMSO) by itself, (2) DMSO in combination with an amine formaldehyde polymerization catalyst, and (3) DMSO in combination with solvents and a conventional amine polymerization catalyst. The results of these examples are tabulated in the table given below.

*Table*

| Example | Reaction Medium | Catalyst | Exposure to CH$_2$O (min.) | Yield (g.) | N sp./c. (dl./g.) |
|---|---|---|---|---|---|
| I | DMSO | None | 4 | 1.4 | 0.63 |
| II | DMSO | ----do---- | 4 | 2.3 | 0.85 |
| III | DMSO | 0.008 ml. tri-n-butyl amine | 4 | 1.9 | 0.62 |
| IV | DMSO | ----do---- | 4 | 2.0 | 0.76 |
| V | 1 part DMSO, 3 parts benzene | ----do---- | 4 | 2.2 | 0.35 |
| VI | 1 part DMSO, 1 part benzene | ----do---- | 4 | 2.4 | 0.47 |
| VII | 3 parts DMSO, 1 part benzene | ----do---- | 4 | 2.1 | 0.56 |
| VIII | 3 parts CCl$_4$, 1 part DMSO | ----do---- | 8 | 3.0 | 0.42 |
| IX | CCl$_4$ | ----do---- | 10 | 1.8 | 0.28 |
| X | Benzene | ----do---- | 4 | 1.7 | 0.27 |

The above specific Examples I and II clearly indicate that high quality polyoxymethylene polymers may be obtained in good yield using dimethyl sulfoxide as the reaction medium. It is clearly indicated that no specific polymerization catalyst is required to obtain good results. Furthermore, it is seen in V–VIII that conventional organic solvents may be used in combination with dimethyl sulfoxide, if desired, however increasing the proportion of organic solvent lowers the molecular weight of the polymer. Examples IX and X clearly indicate that only low molecular weight polymer may be obtained under the conditions of the experiment if no DMSO is used.

We claim:
1. A method for preparing polyoxymethylene which comprises contacting a water contaminated formaldehyde gas with dimethyl sulfoxide maintained at a temperature of from about 0 to about 100° C., and recovering the polyoxymethylene polymer from said dimethyl sulfoxide.

2. The method of claim 1 wherein said formaldehyde gas contains less than about 5% water by weight.

3. A method for polymerizing gaseous formaldehyde into a high molecular weight polyoxymethylene polymer which comprises introducing formaldehyde gas containing less than about 10% by weight of water into a reaction medium comprising dimethyl sulfoxide and less than about 10% water, ceasing said formaldehyde addition when about 10% by weight formaldehyde is absorbed in said dimethyl sulfoxide, and recovering the polyoxymethylene polymer from said dimethyl sulfoxide.

4. The method of claim 3 wherein said formaldehyde gas introduced into said dimethyl sulfoxide contains from about 1 to about 10 volume percent of an inert carrier gas.

5. The method of claim 4 wherein said mixture of formaldehyde and inert carrier gas is maintained at a temperature of from about 40 to about 100° C.

6. The method of claim 3 wherein said polyoxymethylene polymer is recovered from the dimethyl sulfoxide reaction mixture by heating said reaction mixture to above the melting point of said polymer and admixing said heated mixture with a non-solvent for polyoxymethylene.

7. The method of claim 6 wherein said non-solvent is water.

8. The method of claim 3 wherein said dimethyl sulfoxide contains from about 1 to about 3 parts by weight of an inert solvent selected from the group consisting of hydrocarbons and halogenated hydrocarbons.

9. The method of claim 3 wherein the reaction is carried out in the presence of a basic formaldehyde polymerization catalyst.

10. The method of claim 8 wherein said reaction is carried out in the presence of a tertiary amine formaldehyde polymerization catalyst.

References Cited by the Examiner

UNITED STATES PATENTS

| | | | |
|---|---|---|---|
| 2,543,237 | 2/1951 | Evans et al. | 260—67 |
| 2,768,994 | 10/1956 | MacDonald | 260—67 |
| 2,915,560 | 12/1959 | Steinhardt et al. | 260—67 |
| 2,935,494 | 5/1960 | Whelan et al. | 260—77.5 |
| 3,140,272 | 7/1964 | Yoda et al. | 260—67 |

LOUISE P. QUAST, *Primary Examiner.*

WILLIAM H. SHORT, *Examiner.*

L. M. MILLER, *Assistant Examiner.*